United States Patent [19]

Okada

[11] Patent Number: 5,568,453

[45] Date of Patent: Oct. 22, 1996

[54] RADIO HAVING A RECORDING AND REPRODUCING UNIT RESPONSIVE TO A RADIO WAVE OF A PREDETERMINED FREQUENCY

[75] Inventor: Setsuo Okada, Hokkaido, Japan

[73] Assignee: Hudson Soft Co., Ltd., Hokkaido, Japan

[21] Appl. No.: 411,188

[22] Filed: Mar. 27, 1995

Related U.S. Application Data

[63] Continuation of Ser. No. 151,644, Nov. 15, 1993, Pat. No. 5,448,534.

[30] Foreign Application Priority Data

Sep. 20, 1993 [JP] Japan .................................. 5-256513

[51] Int. Cl.⁶ ........................................................ H04H 9/00
[52] U.S. Cl. ............................................ 369/7; 455/33.1
[58] Field of Search ........................ 369/7, 6, 8; 455/89, 455/90, 345, 33.1, 33.2, 36.1, 38.1

[56] References Cited

U.S. PATENT DOCUMENTS

| | | | |
|---|---|---|---|
| 4,380,821 | 4/1983 | Eckhardt | 455/33 |
| 5,263,199 | 11/1993 | Barnes et al. | 369/7 |

FOREIGN PATENT DOCUMENTS

| | | | |
|---|---|---|---|
| 3423607 | 1/1985 | Germany | 369/7 |
| 59-94940 | 5/1984 | Japan | 369/7 |
| 60-254833 | 12/1985 | Japan | 369/7 |
| 60-254835 | 12/1985 | Japan | 369/7 |
| 60-254836 | 12/1985 | Japan | 369/7 |
| 60-254831 | 12/1985 | Japan | 369/7 |
| 2127245 | 4/1984 | United Kingdom | 369/7 |

*Primary Examiner*—Tan Dinh
*Attorney, Agent, or Firm*—Lowe, Price, LeBlanc & Becker

[57] ABSTRACT

A radio system has a detector detecting a required radio program, and supplying an instruction signal when the program is detected thereby. In accordance with the instruction signal, a recording unit begins to record the program.

8 Claims, 5 Drawing Sheets

RADIO HAVING A RECORDING AND REPRODUCING UNIT RESPONSIVE TO A RADIO WAVE OF A PREDETERMINED FREQUENCY

This application is a continuation of application Ser. No. 08/151,644 filed Nov. 15, 1993 and now is U.S. Pat. No. 5,448,534.

BACKGROUND OF THE INVENTION

The present invention relates to a radio which may record radio programs, and more particularly to an improved radio by which broadcasted programs may be easily reproduced at need.

Radios have advantage in that a variety of information may be acquired, while doing something else, for example, driving cars. However, people tend to easily miss important information, such as traffic information, weather information and the like.

In order to solve the above mentioned problem, traditionally, the currently broadcasted program is recorded on a tape and is reproduced at need. The speed of rewinding the tape is faster than that for reproducing, so that the reproduction program may overtake the currently broadcasted program.

According to the conventional radio, however, there is a disadvantage in that only the currently broadcasted program may be recorded. Therefore, if a listener misses to tune the radio to the needed program or misses to turn on the radio itself, needed information may not be acquired quickly.

SUMMARY OF THE INVENTION

Accordingly, it is an object of the invention is to provide a radio by which needed information may be acquired anytime easily.

According to the invention, a radio system includes a detector detecting a required radio program, and supplying an instruction signal when the program is detected thereby. In accordance with the instruction signal, the program begins being recorded.

DETAILED DESCRIPTION OF THE INVENTION

A radio according to the invention is now described in conjunction with appended drawings.

Figure 1:
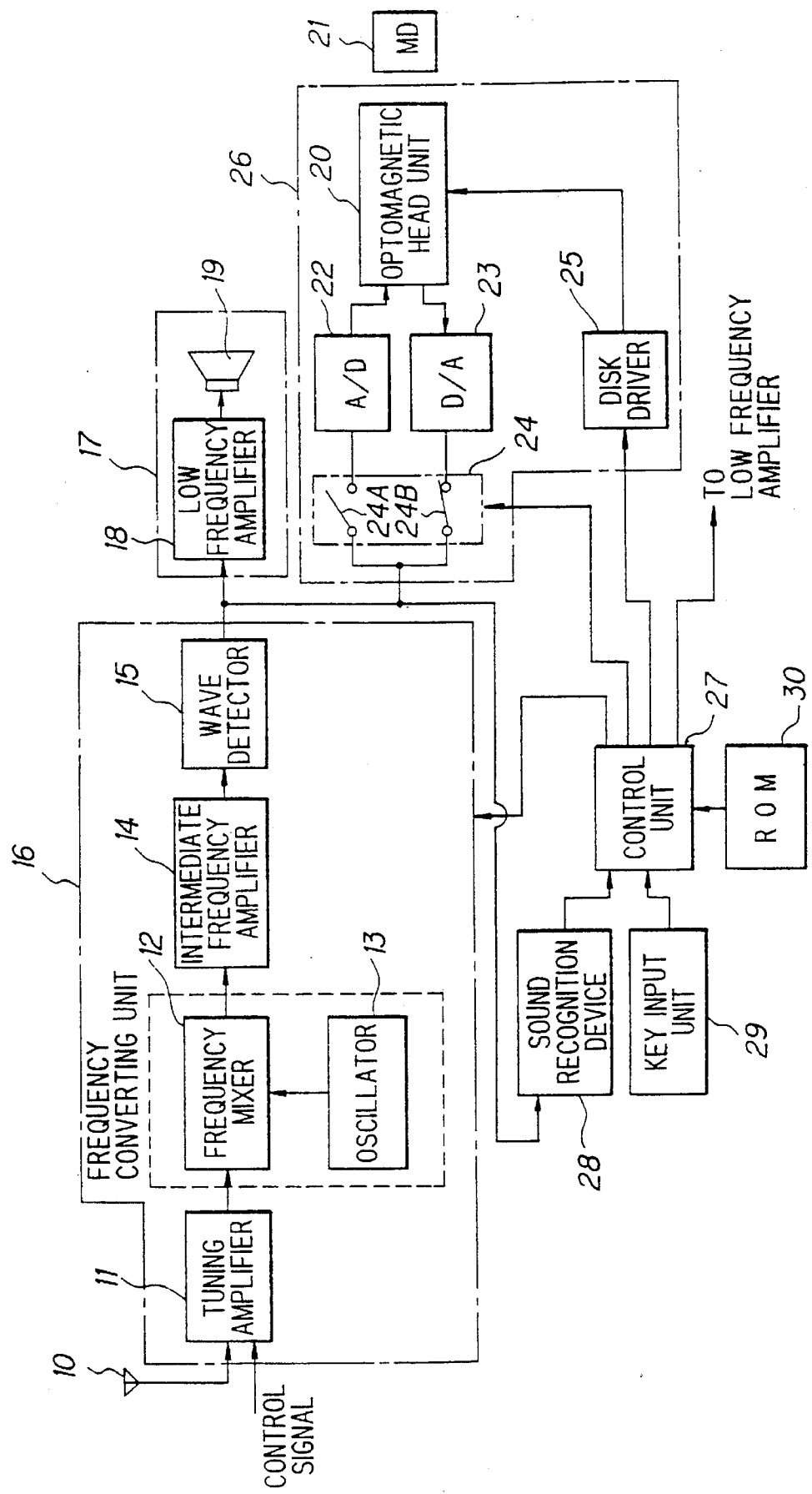
FIG. 1 is a block diagram showing a radio according to a first preferred embodiment of the invention.

FIG. 1 shows a radio system according to a first preferred embodiment, which includes an antenna 10, a receiving unit 16 for receiving radio waves in a predetermined range of frequency, a recording and reproducing unit 26 operating in recording and reproduction modes, a sound data output unit 17 for amplifying sound signals supplied from the receiving unit and reproduced signals from the recording and reproduction unit, and a controller 27 for controlling the operation modes of the recording and reproducing unit.

In the recording mode, the sound signals supplied from receiving unit 16 are recorded in a so-called mini-disk (or mini-card), which will be described later. In the reproduction mode, the sounds signals recorded in the mini-disk are reproduced. The controller controls the recording and reproduction unit in response to instructions transferred from an external device.

The receiving unit includes a tuning amplifier 11 for amplifying the radio waves only in the predetermined range of frequency, an oscillator 13 for generating an oscillating frequency, a frequency mixer 12 for mixing the received radio waves and oscillating frequency to convert the frequency of the received radio waves into a lower intermediate frequency, an intermediate frequency amplifier 14 for amplifying the intermediate frequency, and a wave detector 15 for detecting the sound signals in an output signal of the intermediate frequency amplifier.

The recording and reproduction unit 26 includes a switch unit 24, an A/D converter 22, an optomagnetic head unit 20, a D/A converter 23 and a disk driver 25. The switch unit 24 is turned on and off to select one operation mode from the recording and reproduction modes. The A/D converter 22 converts the sound signal analog signal), which is supplied from the wave detector 15, into a digital signal. The optomagnetic head unit records the digital signal from the A/D converter 22 on the mini-disk 21, and reproduces the recorded digital sound. The D/A converter 23 converts the digital sound signal, which is supplied from the optomagnetic head unit 21, into an analog signal. The disk driver rotates the mini-disk 21 at a predetermined speed.

The sound output unit 17 includes a low frequency amplifier 18 for amplifying sound signals supplied from the wave detector 15 and mini-disk 21, and a loudspeaker 19 for converting the sound signals to audible sound.

The controller is connected to a sound recognition device 28, an input device 29, and a ROM 30, which is for storing a predetermined program. The sound recognition device recognizes predetermined radio programs, such as traffic information, weather information and the like, from the sound signal supplied from the D/A converter 23. A variety of instructions and information may be supplied through the input device, such as a keyboard, to the radio. The controller 27 controls the receiving unit 16, sound output unit 17 and recording and reproduction unit 26, in accordance with information supplied from the sound recognition device 28, input device 29 and ROM 30.

When the sound recognition device 28 detects sound corresponding to the needed program, the switches 24A and 24B turn on and off, respectively, to select the recording mode independently of the condition (on or off) of the low frequency amplifier 18. In the recording mode, the optomagnetic head unit 20 records the detected radio program on the mini-disk.

When the reproduction mode is selected by the input device 29, the low frequency amplifier 18 turns on, the switches 24A and 24B turn off and on, respectively. In the reproduction mode, the optomagnetic head unit 20 reproduces the recorded program, and the reproduced sound is supplied to the loudspeaker 19.

In the reproduction mode, when a search instruction is supplied from the input device 29, the controller 27 controls the operation speed of the disk driver 25. When the required program is found, the program is reproduced at a normal speed, but the other programs are reproduced at a high speed. Such search processing may be performed manually by using high-speed and normal-speed reproduction keys (not shown) on the input device 29.

The mini disk 21 is loaded in the optomagnetic head unit 20, and the receiving unit 16 is tuned to a predetermined frequency in advance. The required program, such as traffic information, is memorized in the sound recognition device 28.

When the sound recognition device 28 detects sound for the traffic information from the sound signal supplied from the wave detector 15, a recognition signal is supplied to the controller 27. In response to the recognition signal, the recording and reproduction unit 26 comes in the recording mode under control of the controller 27. That is, the switches 24A and 24B turn on and off, respectively, to make the optomagnetic head unit 20 being in the recording mode.

In the recording mode, sound signals of the traffic information, which are supplied from the wave detector 15, are converted into digital sound signals by the A/D converter 22, and the digital signals are recorded on the mini-disk 21.

Figure 2:
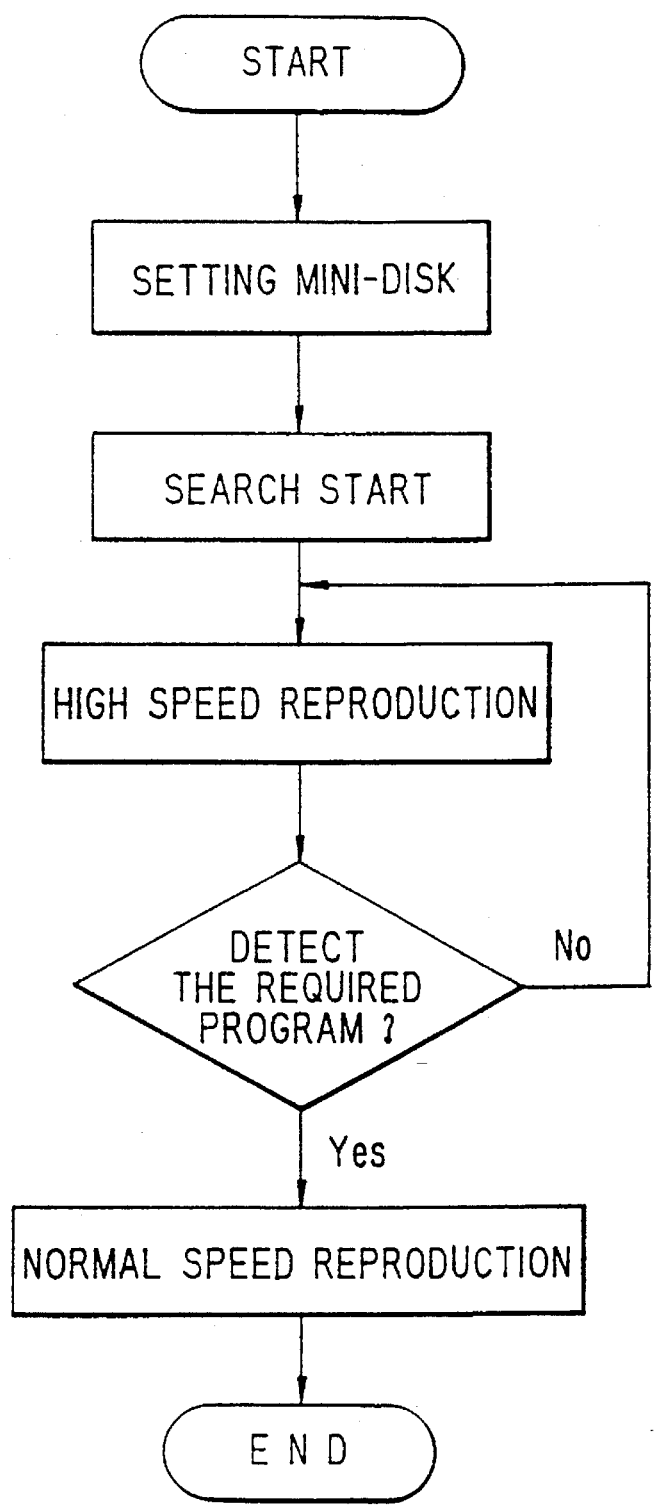
FIG. 2 is a flow chart showing reproduction operation of the first preferred embodiment.

FIG. 2 shows steps to reproduce the recorded sound information on the mini-disk 21. When the mini disk 21 is loaded in the optomagnetic head unit 20, and the instruction for searching the traffic information program is given, the recording and reproduction unit 26 comes in the reproduction mode by the controller 27. That is, the switches 24A and 24B turn on and off, respectively, the optomagnetic head unit 20 operates in the reproduction mode, so that the mini-disk 21 is rotated at a high speed by the disk driver 25.

Programs other than the traffic information are reproduced at a high speed, and the reproduced sound signals are supplied through the low frequency amplifier 18 to the loudspeaker 19.

When the sound recognition device detects the traffic information program, the program is reproduced at the normal speed under control of the controller.

The mini-disk may be available in homes, offices, cars and the like. In the above mentioned embodiment, if the traffic information program is recorded on the mini-disk at a region starting from a predetermined start address, the program may be reproduced without such searching processing.

Figure 3:
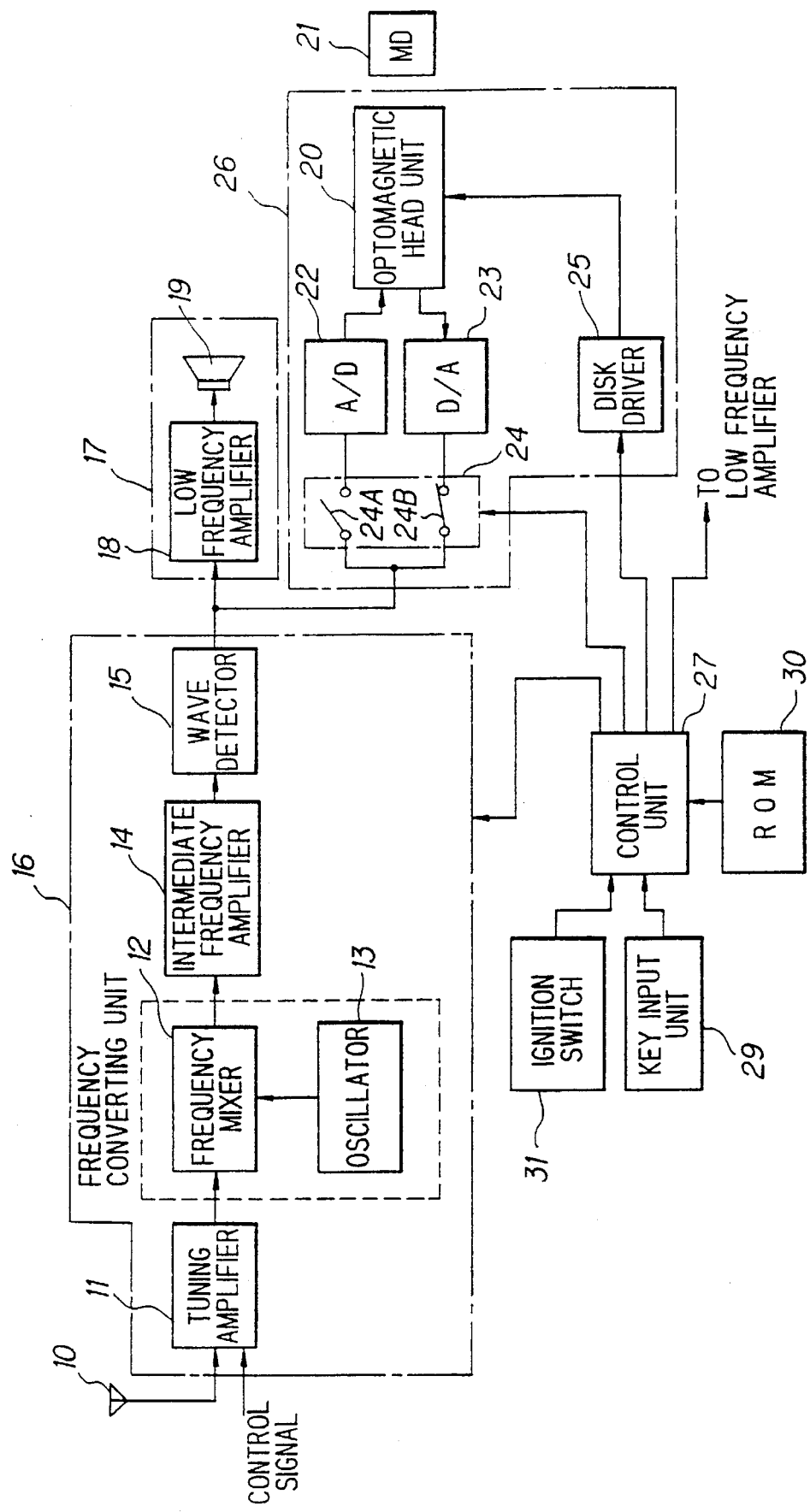
FIG. 3 is a block diagram showing a radio according to a second preferred embodiment of the invention.

FIG. 3 shows a second preferred embodiment of the invention, which is applied to a radio in car. In response to a turn on signal of an ignition switch 31, a recording and reproducing unit 26 comes in a recording mode by a controller 27. The recording period of each radio program is limited.

Figure 4:
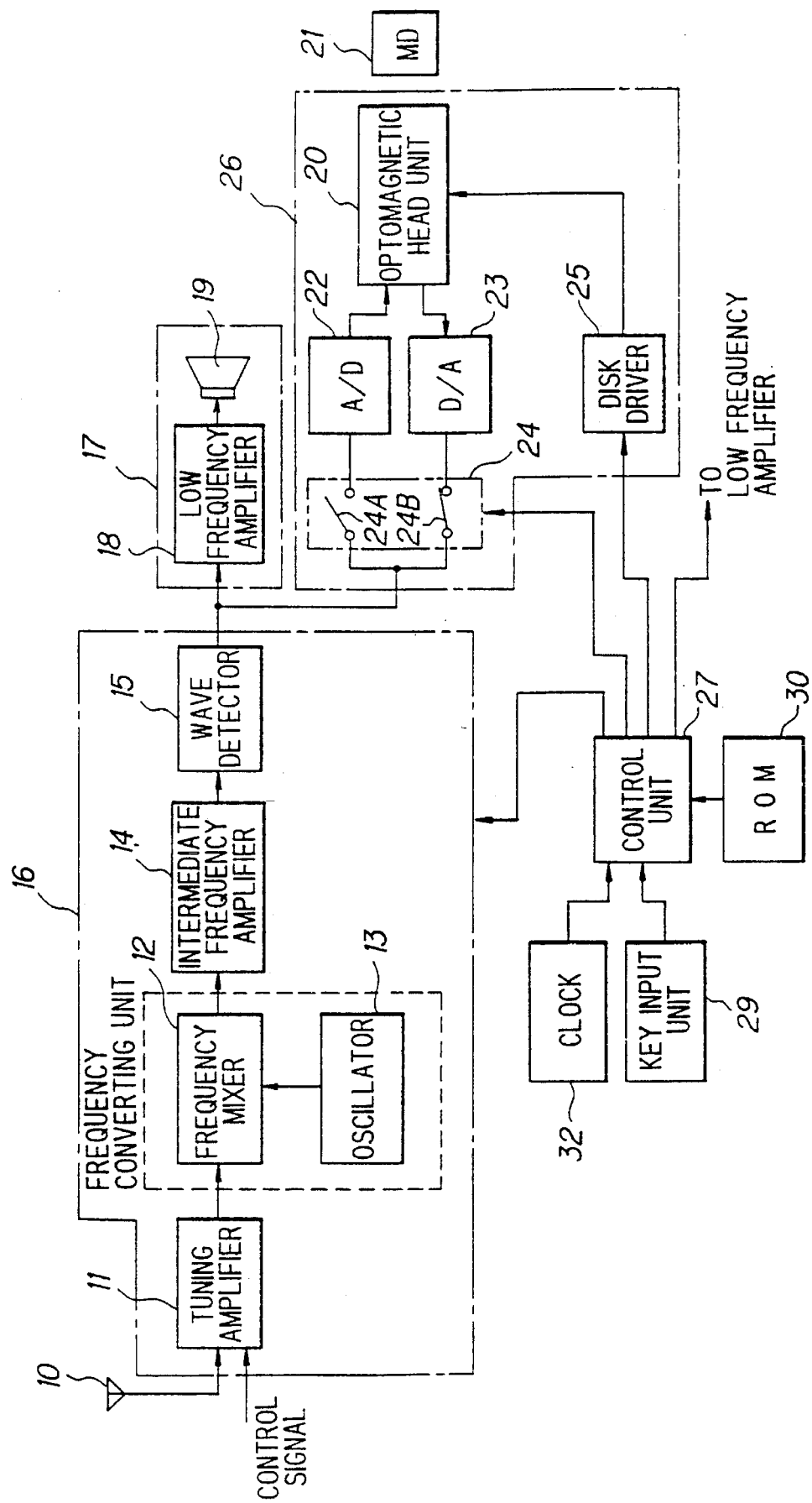
FIG. 4 is a block diagram showing a radio according to a third preferred embodiment of the invention.

FIG. 4 shows a third preferred embodiment of the invention, which includes a timer function. In this embodiment, when a time supplied to an input device 29 and a time on a clock 32 correspond to each other, a correspondence signal is supplied to a controller 27. In response to the corresponding signal, a recording and reproduction unit 26 comes in the recording mode.

Figure 5:
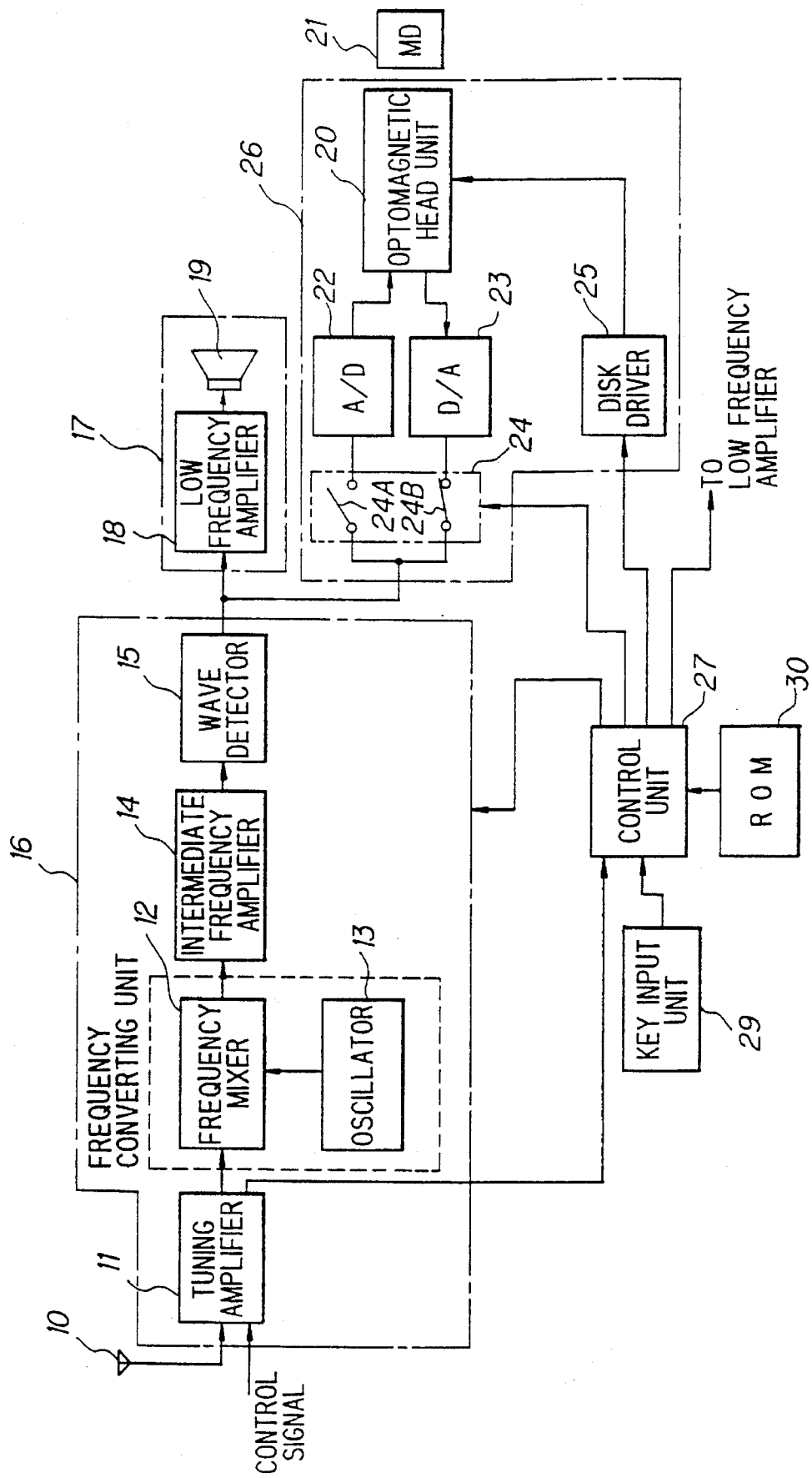
FIG. 5 is a block diagram showing a radio according to a fourth preferred embodiment of the invention.

FIG. 5 shows a fourth preferred embodiment of the invention, in which a radio wave of a predetermined frequency (for example, 1620 KHz), such as for traffic information, is monitored at a predetermined interval in sections on highway roads. The monitoring operation is realized by adjusting a tuning amplifier 11. When the radio wave of traffic information is received, the information is recorded automatically by a recording and reproduction unit 26.

In the above mentioned embodiments, the mini-disk is employed as a recording medium; however, cassette tapes and IC cards may be employed instead.

I claim:

1. A radio with recording and reproducing functions comprising:

a receiving unit including a tuning amplifier, said amplifier generating at least an indicating signal in response to a radio wave of a predetermined frequency;

a recording and reproducing unit including an optometric head unit and a disk driver;

a mini-disk for loading into said optometric head unit, said mini-disk being rotated within said head unit by said disk driver;

an input device for generating instruction signals for said recording and reproducing unit;

a controller responsive to said instruction signals and said indicating signal for controlling said recording and reproducing unit, said controller overriding the instruction signals of said input device to said recording and reproducing unit in the presence of said indicating signal, wherein said controller controls the receiving unit so that radio waves of a predetermined frequency for a predetermined radio program are monitored at a predetermined interval in a predetermined area, and the predetermined radio program is recorded in preference to a currently broadcasted program by the recording and reproduction unit when the radio waves of the predetermined frequency are detected.

2. The radio of claim 1, wherein said input device is a key input unit.

3. The radio of claim 1, wherein said input device is a ROM.

4. The radio of claim 1, wherein said controller places said recording and reproducing unit into a recording mode in the presence of said indicating signal.

5. A radio with recording and reproducing functions comprising:

a receiving unit including:

a tuning amplifier for generating an indicating signal in response to radio waves of a predetermined frequency and for amplifying radio waves of a predetermined range of frequencies, an oscillator for generating an oscillating frequency, a frequency mixer for mixing the amplified radio waves of a predetermined range of frequencies and the oscillating frequency for converting a frequency of the amplified radio waves into a lower intermediate frequency, an intermediate frequency amplifier for amplifying the intermediate frequency, and a wave detector for detecting sound signals in an output signal of the intermediate frequency amplifier;

a recording and reproducing unit for operating in a recording mode in which said sound signals are recorded, and in a reproducing mode in which said recorded sound signals are reproduced, said unit including:

a switch unit for turning on and off one of the recording and reproducing modes, an A/D converter coupled to said switch unit for converting said sound signal into digital signals, an optometric head unit for recording said digital signals from the A/D converter on a recording medium, and a D/A converter coupled to said optometric head unit for converting said digital signals stored on said recording medium into reproduced sound signals;

an input device for generating instruction signals for said recording and reproducing unit; and a control unit responsive to said instruction signals and said indicating signal for controlling the switch unit of said recording and reproducing unit, said control unit overriding the instruction signals of said input device to said recording and reproducing unit in the presence of said indicating signal.

6. The radio of claim 5, wherein said input device is a key input unit.

7. The radio of claim 5, wherein said input device is a ROM.

8. The radio of claim 5, wherein the recording medium is a mini-disk, and wherein said recording and reproducing unit further includes a disk driver coupled to said optometric head unit for driving said mini-disk.

* * * * *